(12) United States Patent
Marsden et al.

(10) Patent No.: US 10,967,747 B2
(45) Date of Patent: Apr. 6, 2021

(54) VEHICLE SYSTEM FOR CONTROLLING CHARGING OF A TRACTION BATTERY OF A VEHICLE

(71) Applicant: Jaguar Land Rover Limited, Coventry (GB)

(72) Inventors: Paul Marsden, Coventry (GB); Baptiste Bureau, Coventry (GB)

(73) Assignee: Jaguar Land Rover Limited, Coventry (GB)

(*) Notice: Subject to any disclaimer, the term of this patent is extended or adjusted under 35 U.S.C. 154(b) by 0 days.

(21) Appl. No.: 15/780,121

(22) PCT Filed: Dec. 14, 2016

(86) PCT No.: PCT/EP2016/080947
§ 371 (c)(1),
(2) Date: May 30, 2018

(87) PCT Pub. No.: WO2017/108521
PCT Pub. Date: Jun. 29, 2017

(65) Prior Publication Data
US 2018/0345799 A1 Dec. 6, 2018

(30) Foreign Application Priority Data
Dec. 22, 2015 (GB) .................... 1522646

(51) Int. Cl.
*H02J 7/00* (2006.01)
*B60L 53/00* (2019.01)
(Continued)

(52) U.S. Cl.
CPC ............ *B60L 53/00* (2019.02); *B60L 11/184* (2013.01); *B60L 53/53* (2019.02); *B60L 53/62* (2019.02);
(Continued)

(58) Field of Classification Search
CPC ... Y02T 90/14; Y02T 10/7005; Y02T 90/128; Y02T 10/7088; Y02T 90/163
See application file for complete search history.

(56) References Cited

U.S. PATENT DOCUMENTS 5,462,439 A * 10/1995 Keith ................... B60L 1/08
320/109
2012/0249061 A1* 10/2012 Watanabe ............ B60L 11/123
320/107
(Continued)

FOREIGN PATENT DOCUMENTS

| DE | 10 2010 029 118 A1 | 11/2011 |
| GB | 2 273 614 A | 6/1994 |
| WO | 2013/139617 A1 | 9/2013 |

OTHER PUBLICATIONS

Patents Act 1977: Combined Search and Examination Report under Sections 17 and 18(3), UKIPO Application No. GB1522646.7, dated Apr. 25, 2016, 6 pp.
(Continued)

*Primary Examiner* — Arun C Williams
(74) *Attorney, Agent, or Firm* — Miller Nash Graham & Dunn LLP (57) ABSTRACT

A vehicle system 100, for controlling charging of a traction battery 110 of a vehicle 400, comprising: means 130 for, when a next vehicle journey 10 requires charging of a traction battery 110, automatically controlling a charging level 14 of charging the traction battery 110, in dependence upon the next vehicle journey 10, and a timing 12 of charging of the traction battery 110.

21 Claims, 3 Drawing Sheets

(51) Int. Cl.
*G01C 21/34* (2006.01)
*B60L 58/12* (2019.01)
*B60L 53/64* (2019.01)
*B60L 53/53* (2019.01)
*B60L 53/68* (2019.01)
*B60L 53/62* (2019.01)
*B60L 11/18* (2006.01)
*B60W 50/14* (2020.01)

(52) U.S. Cl.
CPC .............. *B60L 53/64* (2019.02); *B60L 53/68* (2019.02); *B60L 58/12* (2019.02); *B60W 50/14* (2013.01); *G01C 21/3469* (2013.01); *B60K 2370/11* (2019.05); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(56) References Cited

U.S. PATENT DOCUMENTS

2013/0024055 A1* 1/2013 Hysko, Jr. ......... B60W 50/0097
 701/22
2014/0371970 A1 12/2014 Lovett et al.
2015/0283912 A1 10/2015 Shimizu et al.

OTHER PUBLICATIONS

International Search Report and Written Opinion of the International Searching Authority, International Application No. PCT/EP2016/080947, dated Apr. 6, 2017, 16 pp.

* cited by examiner

VEHICLE SYSTEM FOR CONTROLLING CHARGING OF A TRACTION BATTERY OF A VEHICLE

RELATED APPLICATIONS

This application is a 35 U.S.C. § 371 national stage application of PCT Application No. PCT/EP2016/080947, filed on Dec. 14, 2016, which claims priority from Great Britain Patent Application No. 1522646.7, filed on Dec. 22, 2015, the contents of which are incorporated herein by reference in their entireties. The above-referenced PCT International Application was published in the English language as International Publication No. WO 2017/108521 A1 on Jun. 29, 2017.

TECHNICAL FIELD

The present disclosure relates to a processor for controlling charging of a traction battery of a vehicle. In particular, but not exclusively it relates to automatic control of charging of a traction battery of a vehicle.

Aspects of the invention relate to a vehicle system, a method, a vehicle electronic control unit, a computer program, and vehicle.

BACKGROUND

It has become more common for a vehicle to have a traction battery that is used to propel or help propel a vehicle.

It may be necessary to recharge a traction battery by sourcing electrical energy from a charging point external to the vehicle. At present, the charging capacity of vehicle propulsion batteries is not sufficient for vehicle journeys of significant length. It is therefore necessary on some extended journeys to recharge the vehicle traction battery at a charging waypoint in the journey and/or to ensure that the vehicle traction battery is sufficiently charged before starting a journey.

An occupant of a vehicle may have "range anxiety" arising from a concern that the vehicle will not reach its journey destination because the traction battery will have insufficient energy.

It may also be a concern for a vehicle occupant that the financial cost of charging the vehicle traction battery may be significantly more expensive at a charging point on the journey than it would be at a home charging point.

It is an aim of the present invention to provide a vehicle system for controlling automatically charging of a traction battery of a vehicle that addresses at least some of these concerns.

SUMMARY OF THE INVENTION

Aspects and embodiments of the invention provide a vehicle system, a method, a node of a vehicle bus, a vehicle electronic control unit, a computer program, and a vehicle as claimed in the appending claims.

According to an aspect of the present invention there is provided a controller, for controlling charging of a traction battery of a vehicle, configured to:

determine a state of charge of the traction battery;

determine, dependent upon the state of charge and at least part of the next vehicle journey, one or more of: the target state of charge to be achieved, the rate of charging of the battery duration of charging of the battery; and start time of charging of the battery.

The controller may also temporarily override any user-programmed vehicle settings controlling the target state of charge to be achieved and/or the rate of charging of the battery and/or the duration of charging of the battery and/or start time of charging of the battery.

The controller may override the user-programmed vehicle settings until the next vehicle journey is complete or until the vehicle including the traction battery is next switched on or next switched off.

Any one or more of the target state of charge to be achieved, the rate of charging of the battery, duration of charging of the battery and start time of charging of the battery may be adaptively controlled by the controller.

The controller may control the one or more of the target state of charge to be achieved, the rate of charging of the battery, duration of charging of the battery and start time of charging of the battery in dependence upon a next charging point of the next vehicle journey.

The controller may control the one or more of the target state of charge to be achieved, the rate of charging of the battery, duration of charging of the battery and start time of charging of the battery so that the charging level of the traction battery is sufficient to reach a next charging point of the next vehicle journey.

The controller may control the start time of charging of the battery to enable immediate charging of the traction battery.

The controller may be configured to automatically determine when a next vehicle journey requires charging of a traction battery. The next vehicle journey may be a part of a journey in progress or from a charging waypoint in the journey, or at least a part of a scheduled journey not yet started. The next vehicle journey may be to a user-programmed destination and wherein the next vehicle journey 10 exceeds a range of the traction battery 110.

The controller may control one or more of the target state of charge to be achieved, the rate of charging of the battery, duration of charging of the battery and start time of charging of the battery in dependence upon one or more characteristics of at least one charging point of the next vehicle journey.

The one or more characteristics of a current charging point may be selected from: tariff at the current charging point, a future tariff at the current charging point, a charging rate at the current charging point and a wait-time for the current charging point.

The one or more characteristics of a next charging point may be selected from: a tariff at the next charging point, a future tariff at the next charging point, a charging rate at the next charging point and a wait-time at the next charging point.

According to an aspect of the present invention there is provided a vehicle system comprising the controller as claimed in any of the preceding paragraphs. The system may further include communication means for communicating with a remote server 500 to download at least some of the characteristics.

The controller of any of the preceding paragraphs may include an output and be configured to send a signal indicating the automatic control of charging the traction battery.

A vehicle system may include a controller of the previous paragraph and a human machine interface configured to display the automatic control of charging the traction battery and optionally, inform a vehicle occupant that the automatic control of charging the traction battery is temporary and that user-programmed vehicle settings will be restored.

A controller according to any of the previous paragraphs may further control one or more of the target state of charge to be achieved, the rate of charging of the battery, duration of charging of the battery and start time of charging of the battery in dependence upon the next vehicle journey by optimising a cost determined by a cost function, wherein the cost function determines cost using a time of arrival criterion and/or a financial cost criterion.

The cost function may be pre-programmed by user selection as part of journey navigation.

According to another aspect of the present invention there may be provided a vehicle including a controller a vehicle system as described in any of the previous claims.

According to another aspect of the present invention there is provided a method, for controlling charging of a traction battery of a vehicle, comprising the steps of:

determining a state of charge of the traction battery;

determining, dependent upon the state of charge and at least part of the next vehicle journey, one or more of the target state of charge to be achieved, the rate of charging of the battery, duration of charging of the battery and start time of charging of the battery.

According to an aspect of the invention there is provided a vehicle system for controlling charging of a traction battery of a vehicle comprising: means for, when a next vehicle journey requires charging of a traction battery, automatically controlling a charging level of charging the traction battery, in dependence upon the next vehicle journey, and a timing of charging of the traction battery. This has the advantage that the vehicle system automatically controls the charging level of charging the traction battery in dependence upon the next vehicle journey. This may, for example, ensure that there is sufficient energy stored to enable completion of the vehicle journey and/or it may take into account other requirements such as the time taken to complete the charging and the financial cost of the charging. The control of the timing of the charging of the traction battery will also advantageously control the time at which the charging finishes and, in some circumstances, it may affect the financial cost of the charging.

The vehicle system may normally use user-programmed vehicle settings to control a timing of charging of the traction battery and/or a charging level of charging the traction battery. The automatic control of a charging level of charging the traction battery, in dependence upon the next vehicle journey, and a timing of charging of the traction battery may temporarily override the user-programmed vehicle settings. For example, they may be overwritten until the next vehicle journey is complete and/or until the vehicle is next switched on or next switched off. This has the advantage that the vehicle system can normally use the user-programmed settings for charging which may for example control a timing of charging of the traction battery and/or a charging level of charging the traction battery but can temporarily override the user-programmed vehicle settings to provide additional benefit. The advantage of temporarily overriding the user-programmed vehicle settings is that there is no requirement for the user to program or reprogram the vehicle system to achieve desired control of charging the traction battery.

The control of a charging level of charging the traction battery in dependence upon the next vehicle journey may be an adaptive control that changes with different next vehicle journeys. This has the advantage that the control of the charging level is adaptive or variable to take into account characteristics of the next vehicle journey.

The adaptive control in dependence upon the next vehicle journey, may be adaptive control in dependence upon a next charging point of the next vehicle journey. This has the advantage that the adaptive control is variable and adapts, for example, to the charging facilities available at the next charging point.

The adaptive control of the charging level in dependence upon the next vehicle journey may be such that the charging level of the traction battery is sufficient to reach a next charging point of the next vehicle journey. This has the advantage that the automated charging is sufficient to reach a next charging point, reducing range anxiety for a vehicle occupant.

The automatic control of a timing of charging of the traction battery, when a next vehicle journey requires charging of a traction battery, may be such that the timing of the charging is such that charging occurs immediately. This has the advantage that additional journey time is not added to the journey time required to complete the next vehicle journey by waiting for the charging of the traction battery to begin.

The vehicle system may automatically determine when a next vehicle journey requires charging of a traction battery. This has the advantage that not only is the control of the charging automatic but the condition that causes the automatic control of charging is automatically monitored. This provides a more flexible and dynamic system.

The next vehicle journey may be part of a journey in progress and the control of charging of a traction battery of a vehicle may be at a charging waypoint of the next vehicle journey. In this case the next vehicle journey is from the charging waypoint.

Alternatively, the next vehicle journey may be the whole or part of a scheduled journey that has not yet started.

The vehicle system therefore advantageously automatically controls charging, in dependence upon the next vehicle journey, either during a vehicle journey or before a vehicle journey has started. This provides enhanced flexibility.

The next vehicle journey may be a user-programmed destination and the next vehicle journey may exceed a range of the traction battery. The system may therefore advantageously automatically control charging when the user wishes to undertake a vehicle journey that exceeds the range of the traction battery and therefore help the user deal with range anxiety.

The vehicle system may comprise a man machine interface that informs a vehicle occupant of the automatic control of the charging level of charging the traction battery, in dependence upon the next vehicle journey and the timing of the charging of the traction battery. This has the advantage that the user is kept informed and reassured about how the vehicle system is managing charging of the battery. This should decrease range anxiety.

The human machine interface may inform a vehicle occupant that the automatic control of a charging level of charging the traction battery, in dependence upon the next vehicle journey and the timing of charging of the traction battery is temporary and that user-programmed vehicle settings that control a timing of charging of the traction battery and/or a charging level of charging the traction battery will be restored. This has the advantage that the user is reassured that their user-programmed vehicle settings, although being temporarily overwritten, will be restored and that there will not be any requirement for them to reprogram the system.

The automatic control of the charging level of charging the traction battery and the timing of charging of the traction battery may be in dependence upon not only the next vehicle journey but also one or more characteristics of at least one charging point of the next vehicle journey. This has the advantage that the automatic control takes into account not only the duration of the next vehicle journey, for example, but also the characteristics of one or more charging points along the next vehicle journey.

The one or more characteristics of a charging point may be, for example, one or more of a tariff at the charging point, a future tariff at the charging point (e.g. a night-time or off-peak tariff), a charging rate or speed at the charging point and a wait time at the charging point. These characteristics enable the vehicle system to assess a cost in time and financial terms of using a particular charging point. The automatic control may, for example, take into account one or more characteristics of a current charging point and also a next charging point or points of the vehicle journey. This has the advantage that the vehicle system can decide whether it should obtain a maximum amount of energy from the current charging point or whether it should merely obtain sufficient energy to reach the next charging point where, for example, there is less cost in time or financially to charging the traction battery to a greater extent.

The characteristics of a charging point may be downloadable to the vehicle from a remote server. This has the advantage that the characteristics may be real time characteristics.

The automatic control of the charging level of charging the traction battery and the timing of charging of the traction battery may depend on the next vehicle journey by optimizing a cost determined by a cost function, wherein the cost function determines a cost using a time of arrival criterion and/or a financial cost criterion. This has the advantage that the controlling of charging at different charging waypoints or charging points in a vehicle journey is intelligently controlled to improve the vehicle arrival time at the destination and/or improve the financial cost of reaching the destination.

The cost function may be pre-programmed by user selection as part of a route navigation. For example, as part of satellite navigation systems one may be asked to select whether one wishes to follow the fastest route or the most economical route.

According to another aspect of the invention there is provided a method, for controlling charging of a traction battery of a vehicle, comprising: when a next vehicle journey requires charging of a traction battery, automatically controlling a charging level of charging the traction battery, in dependence upon the next vehicle journey, and a timing of charging of the traction battery.

This method may, for example, be performed by one or more of: a node of a vehicle bus, a vehicle electronic control unit, a computer program when loaded into a processor, a vehicle system, a vehicle.

According to a further aspect of the present invention there is provided a vehicle system, for controlling charging of a traction battery of a vehicle, comprising: when a next vehicle journey requires charging of a traction battery, automatically controlling a charging level of charging the traction battery in dependence upon the next vehicle journey to provide a vehicle system for controlling automatically charging of a traction battery of a vehicle.

According to another aspect of the invention there is provided a system for controlling charging of a traction battery of a vehicle, the system comprising: means for receiving one or more signals indicative of a next vehicle journey;

means to detect that the next vehicle journey requires charging of a traction battery; and means to control charging of a traction battery of a vehicle by automatically controlling a charging level of charging the traction battery, in dependence upon the next vehicle journey and a timing of charging of the traction battery.

A system as described above, wherein:

said means for receiving one or more signals indicative of a next vehicle journey comprises an electronic processor having an electronic input for receiving said one or more signals indicative of a next vehicle journey; and said means to detect that the next vehicle journey requires charging of the traction battery, and said means to control charging of the traction battery of the vehicle by automatically controlling a charging level or charging the traction battery, in dependence upon the next vehicle journey, and the timing of charging the traction battery comprises the processor being configured to access a memory device and execute instructions stored therein such that it is operable to detect that the next vehicle journey requires charging of the traction battery based on the received signals indicative of the next vehicle journey and command automatic control of a charging level of charging the traction battery, in dependence upon the next vehicle journey, and a timing of charging of the traction battery.

According to a further aspect of the invention there is provided a vehicle system, for controlling charging of a traction battery of a vehicle, comprising: means for, when a next vehicle journey requires charging of a traction battery, automatically controlling a charging level of charging the traction battery in dependence upon the next journey.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1A:
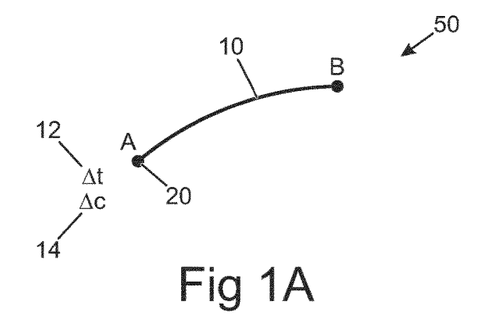
FIGS. 1A and 1B illustrate an example of a method for controlling charging of a traction battery of a vehicle.
Figure 1B:
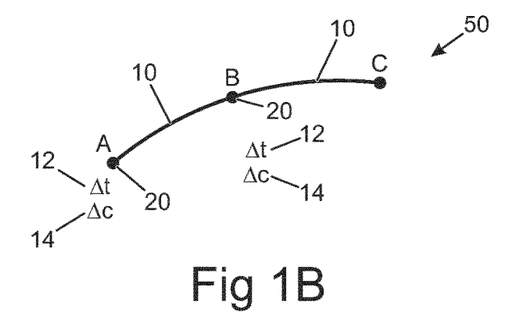

FIGS. 1A and 1B illustrate a method 50 for controlling charging of a traction battery of a vehicle. The method 50 comprises, when a next vehicle journey 10 requires charging of a traction battery, automatically controlling charging of the traction battery, in dependence upon the next vehicle journey 10. Controlling charging of the traction battery may be carried out, for example, by determining the target state of charge of the traction battery, the rate at which the battery is to be charged, the duration the battery should be charged for or the time at which charging the battery begins.

The next vehicle journey may start and end at a charging point. The next vehicle journey may comprise one or more distinct and separate trips. Where the next vehicle journey comprises multiple trips, charging may occur at the start of the first trip at a charging point and at the end of the last trip at a charging point.

The present invention will now be explained with reference to controlling charging of the battery using a target state of charge of the traction battery and the duration the battery should be charged for. The skilled person would understand that control of charging of the battery may be controlled using one or more of a determined target state of charge of the traction battery, a determined rate of charging, a determined duration of charging or a determined time for starting charging.

FIG. 1A illustrates a vehicle journey with a single leg from point A to point B. FIG. 1B illustrates a vehicle journey with two different legs from point A to (way)point B and from (way)point B to point C. Although the leg AB is illustrated as a single trip, in other examples it may comprise multiple trips with the first trip starting from point A and the last trip ending at point B. Although the leg BC is illustrated as a single trip, in other examples it may comprise multiple trips with the first trip starting from (way)point B and the last trip ending at point C. Although the target state of charge 14 of the traction battery and the duration 12 of the charging of the traction battery are consistently referred to using the same symbols and reference numerals for leg AB and leg BC, this does not imply that the control of the state of charge 14 of the traction battery and the duration 12 of the charging of the traction battery is the same for leg AB and leg BC. At least control of the target state of charge 14 of the traction battery at point A, is in dependence upon the next vehicle journey 10—leg AB. At least control of the target state of charge 14 of the traction battery at point B, is in dependence upon the next vehicle journey 10—leg BC.

The starting point, A, is a charging point 20 where a traction battery of a vehicle may be charged. The next vehicle journey 10 from the charging point A is a journey from point A to point B. If it is determined that, at point A, the next vehicle journey 10 requires charging of the traction battery, then the method 50 automatically controls both target state of charge 14 of the traction battery and a duration 12 of the charging of the traction battery. The automatic control of the charging level 14 of charging the traction battery is in dependence upon the next vehicle journey 10. If the next vehicle journey 10 between points A and B were to change then the control of the charging level 14 of charging the traction battery may also change.

The control of charging at the point A may be such that the target state of charge 14 of the traction battery is sufficient, after charging, to reach a next charging point 20, point B, of the next vehicle journey 10.

Referring to FIG. 1B, the waypoint B is a charging waypoint 20 where a traction battery of a vehicle may be charged. The next vehicle journey 10 from the charging waypoint B is a journey from point B to point C. If it is determined that, at point B, the next vehicle journey 10 requires charging of the traction battery, then the method 50 automatically controls both a target state of charge 14 of the traction battery and a duration 12 for charging the traction battery. The automatic control of the target state of charge 14 of the traction battery is in dependence upon the next vehicle journey 10. If the next vehicle journey 10 between points B and C were to change then the control of target state of charge 14 of the traction battery may also change. The control of charging at the point B may be such that a target state of charge 14 of the traction battery is sufficient, after charging, to reach a next charging point, for example point C, for a next vehicle journey.

It will therefore be appreciated that the method 50 adaptively controls the target state of charge 14 of the traction battery in dependence upon the next vehicle journey 10. If the next vehicle journey 10 changes then the target state of charge 14 is adaptively changed. The adaptive control of the target state of charge 14 of the traction battery may be in dependence upon a next charging point 20 of the next vehicle journey 10.

It should be noted that the automatic control of charging of the traction battery may also, for example, be such that the charging starts automatically without any delay, or it may, for example, be timed to obtain a favourable charging tariff. In such an instance the timing 12 of charging the traction battery may be a duration defined by a start time and an end time. The total duration of charging is controlled to complete charging of the traction battery to target state of charge 14 before the next journey starts. In some but not necessarily all examples, the timing 12 of charging the traction battery may define several charge durations, possibly at different charge rates, to obtain the charging level 14 of the traction battery in time.

It should be appreciated that FIG. 1A and/or FIG. 1B may only show a portion of a greater journey. The next vehicle journey 10 may therefore be part of a journey that is in progress and controlling charging of a traction battery of a vehicle may be at a charging waypoint 20 of the next vehicle journey 10 where the next vehicle journey 10 is from the charging waypoint 20. In such an example point A is a charging waypoint 20 and point B, in FIG. 1B, is a charging waypoint 20. Where FIG. 1B illustrates charging waypoints 20 along a journey then when the vehicle is at point A the next vehicle journey 10 is from point A to point B and when the vehicle is at point B the next vehicle journey 10 is from point B to point C. The user will experience that the control of a state of charge 14 and a duration 12 of charging of a traction battery 110 at the charging waypoint 20 is sufficient for the vehicle to reach the next charging waypoint 20. For example, in FIG. 1B the control of the target state of charge 14 at point A is sufficient for the next vehicle journey between point A and B and the control of target state of charge 14 at point B is sufficient for the next vehicle journey 10 between point B and point C. Alternatively, the point A of FIGS. 1A and 1B may be an origin of a journey and it may be that the next vehicle journey 10 comprises or is at least part of a scheduled journey that has not yet started. It may for example, be a journey identified in a calendar of a user or a commonly repeated journey, for example commuting to and from work.

Referring to FIG. 1A, where the next vehicle journey 10 is a scheduled journey that has not yet been started, the user may experience that control of a target state of charge 14 and control of a duration 12 of the charging of the traction battery 110 may be such that the traction battery 110 is charged to a sufficient level and in time so that the vehicle can complete the next vehicle journey 10 from point A to point B starting at the scheduled departure time.

The next vehicle journey 10 may be towards a user-programmed destination that is positioned from the origin at a distance that exceeds a range of the traction battery 110.

The control of target state of charge 14 and the control of duration 12 of charging of the traction battery 110 may be optimised, for example, to minimise a total charging cost between points A and B (FIG. 1A) and A and C (FIG. 1B) or to minimise a total cost of the charging levels incurred at point A and point B. The total charging cost may be based on a financial cost and/or a time cost.

In the example of FIG. 1A, the point B may be a destination endpoint and in the example of FIG. 1B the point C may be a destination endpoint. Notice that in the example of FIGS. 1A and 1B, but not necessarily all examples, at the destination endpoint a method 50 does not automatically control a target state of charge 14 of the traction battery 110 in dependence upon a next vehicle journey and a duration 12 of charging of the traction battery 110. At the destination endpoint, a different, default, charging regime may be used as described below.

Figure 2:
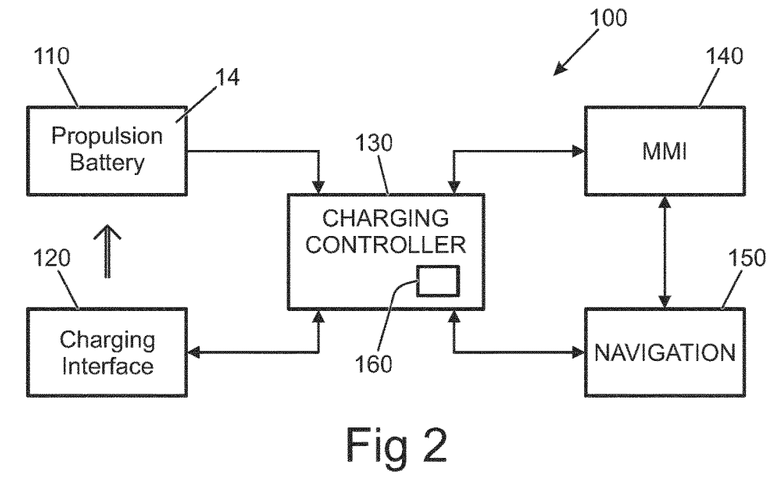
FIG. 2 illustrates an example of a vehicle system for controlling charging of a traction battery of a vehicle.

FIG. 2 illustrates a vehicle system 100 for controlling charging of a traction battery 110 of a vehicle, comprising: means 130 for, when a next vehicle journey 10 requires charging of a traction battery 110, automatically controlling both a target state of charge 14 of the traction battery 110, in dependence upon the next vehicle journey 10 and a duration 12 of charging of the traction battery 110.

In this example, the system 100 comprises a charging controller 130, a traction battery 110 that has a target state of charge 14 and a charging interface 120.

The charging interface 120 is configured to interface with an external charging interface to receive electromagnetic energy. This may, for example, be provided wirelessly, for example using inductive charging, or it may, for example, be provided via a wired interconnection. The charging interface 120 is configured to control the provision of electrical energy to the traction battery 110. The provision of electrical energy by the charging interface 120 to the traction battery 110 increases the charging level 14 of the traction battery 110.

In this example, the charging controller 130 is interconnected to the traction battery 110 and to the charging interface 120.

In this example, the charging controller 130 is also interconnected to a human machine interface 140 and to a navigation module 150.

The navigation module 150 may provide data to the charging controller 130 concerning the next vehicle journey 10. The charging controller 130 communicates with the navigation module 150, the charging interface 120 and optionally the traction battery 110 to determine whether or not the next vehicle journey 10 requires charging of the traction battery 110. If it does not, automatic control of charging of the traction battery 110 may not be enabled. If however the next vehicle journey 10 requires charging of the traction battery 110 then automatic control of charging of the traction battery 110 is enabled.

In this example, the charging controller 130 is configured to automatically determine when a next vehicle journey 10 requires charging of the traction battery 110. That is, a decision of whether or not to charge and the enablement of the charging in dependence upon the next vehicle journey 10 is fully automatic. Both the decision that the next vehicle journey 10 requires charging of a traction battery 110 and the enablement of the charging of the traction battery 110 in dependence upon the next vehicle journey 10 are automatic.

The charging controller 130 then controls the charging interface 120 such that the traction battery 110 is charged to a target state of charge 14 that is dependent upon the next vehicle journey 10 and also controls the duration 12 of when the charging of the traction battery 110 occurs.

As previously described in relation to FIGS. 1A and 1B, the charging controller 130 may be configured to automatically enable immediate charging of the traction battery 110 as part of the automatic control. That is, in order that charging the traction battery 110 starts immediately without delay.

The charging controller 130 is configured to adapt the automatic control of charging by the interface 120. It may, for example, adapt the target state of charge 14 of charging the traction battery 110 and/or adapt the duration 12 of charging of the traction battery 110.

The charging controller 130 is configured to adapt the control of target state of charge 14 of charging the traction battery 110 in dependence upon the next vehicle journey 10, for example, it may control the charging level 14 in dependence upon a next charging point 20 of the next vehicle journey 10 in a manner previously described in relation to FIGS. 1A and 1B. The adaptive control by the charging controller 130 may be such that the control of target state of charge 14 of charging the traction battery 110 is such that the target state of charge 14 is as a minimum sufficient to reach a next charging point 20 of the next vehicle journey 10.

The adaptive control by the charging controller 130 may be such that the control of target state of charge 14 of the traction battery 110 is such that the target state of charge 14 exceeds the minimum sufficient to reach a next charging point 20 of the next vehicle journey 10 by a charging margin. The charging margin may be fixed or variable. The charging margin may, for example, include sufficient charge to travel from the next charging point to an alternative charging point.

As previously described in relation to FIGS. 1A and 1B, the charging controller 130 may automatically control the charging of the traction battery 110 in dependence upon the next vehicle journey 10 where the next vehicle journey 10 is part of a journey in progress or where the next vehicle journey 10 is at least a part of a scheduled journey not yet started. Where the next vehicle journey 10 is part of a journey in progress, the charging controller 130 is configured to control charging of the traction battery 110 of the vehicle at a charging waypoint 20 in dependence upon the next vehicle journey 10, from the waypoint 20.

The human machine interface 140 may enable a user to program a destination for any vehicle journey and the next vehicle journey 10 may be to a user-programmed destination.

The charge controller 130 may be configured to only automatically change the control of charging of the traction battery 110 when a duration of the next vehicle journey 10 exceeds a current range of the traction battery 110.

Although in this example the functionality required for performing the method 50 has been described in relation to the charging controller 130, it should be appreciated that it may in whole or in part be carried out by other components of the system 100 such as for example the charging interface 120. Therefore, in some examples, the charging controller 130 may be a part of the charging interface 120.

FIG. 2 illustrates that the charging controller 130 stores vehicle settings 160 that by default control automatic charging of the traction battery 110 according to a default charging regime. The vehicle settings 160 may be user-programmed vehicle settings that are used to control a timing 12 of charging of the traction battery 110 and/or control a target state of charge 14 of the traction battery 110. In the example illustrated in FIG. 3, a data structure 162 records a target state of charge setting that specifies a default target state of charge 14 of the traction battery 110 and a data structure 164 records a timing setting that specifies a default start and end time 12 for charging of the traction battery 110. When the charging controller 130 performs automatic control of a target state of charge 14 of the traction battery 110, in dependence upon the next vehicle journey 10 and a duration 12 of charging of the traction battery 110, it temporarily overrides the default user-programmed vehicle settings 160 and uses instead dynamically determined vehicle settings 170. The new settings 170 include a data structure 172 that records a target state of charge setting that specifies a current desired target state of charge 14 of the traction battery and a data structure 174 that records a state setting that specifies a current start and end time 12 of charging of the traction battery 110. The charging controller 130 temporarily uses the settings 170 instead of the settings 160.

Figure 3:
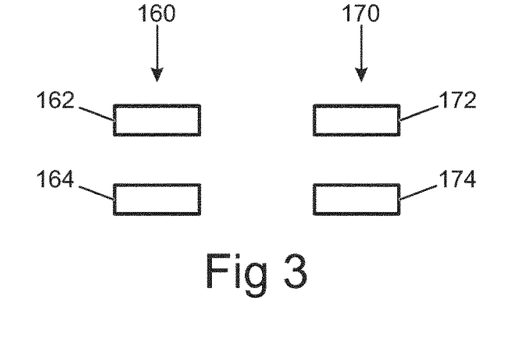
FIG. 3 illustrates an example of vehicle settings.

It will be understood that rather than specifying a start time and an end time for charging of the traction battery 110 the charging controller 130 may specify a start time and a duration for charging of the traction battery 110 or any other suitable charging strategy.

The charging controller 130 may use the new settings 170 until the next vehicle journey 10 is complete or until the vehicle is next switched on or until the vehicle is next switched off. The use of the new vehicle settings 170 is only temporary for the purpose of travelling the journey in that the charging controller 130 will, in future, automatically use the default vehicle settings 160.

Figure 4:
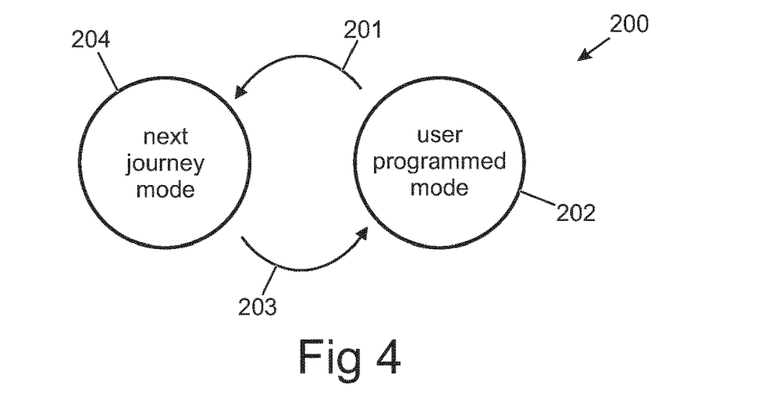
FIG. 4 illustrates an example of a state diagram for a vehicle system.

FIG. 4 illustrates a state machine 200 of the charging controller 130. In a first default state 202, the charge controller 130 uses the default vehicle settings 160 to automatically control the target state of charge 14 and/or timing 12 of charging of the traction battery 110. The state diagram also illustrates a different temporary state 204 in which the charging controller 130 uses the new settings 170 to control the target state of charge 14 and timing 12 of the charging of the traction battery 110 in dependence upon the next vehicle journey 10. The transition 201 from the default state 202 (user-programmed mode) to the temporary state 204 (next journey mode) occurs when it is determined that a next vehicle journey 10 requires additional charging of a traction battery 110. The return transition 203 from the temporary state 204 (next journey mode) to the default state 202 (user program mode) may occur after the automatic additional charging required is complete or the next vehicle journey 10 has been completed.

Figure 5:
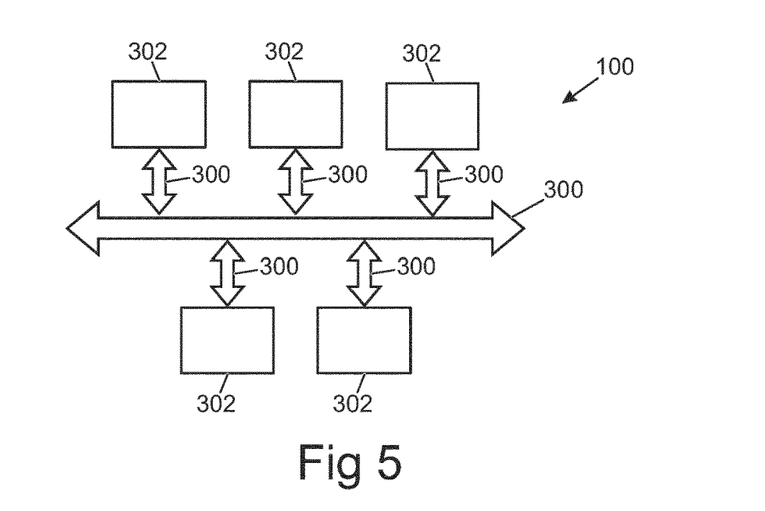
FIG. 5 illustrates another example of the vehicle system.

FIG. 5 illustrates an example of a vehicle system 100 suitable for performing the methods previously described and suitable for functioning as the vehicle system 100 described in relation to FIGS. 2, 3 and 4.

In this example, the vehicle system 100 comprises a vehicle bus 300 and a plurality of vehicle bus nodes 302. One or more of the vehicle bus nodes 302 may be vehicle electronic control units that comprise transceivers enabling them to communicate via the vehicle bus 300 and additional controller circuitry. Each of the vehicle bus nodes 302 performs a different function. This distributed architecture may be used when implementing the vehicle system 100. For example, one or more of the vehicle bus nodes 302 whether or not they are electronic control units may be capable of performing some or all of the functions of at least some of the components of FIG. 2 such as the charging interface 120, the charging controller 130, the human machine interface 140 and the navigation module 150.

Figure 6:
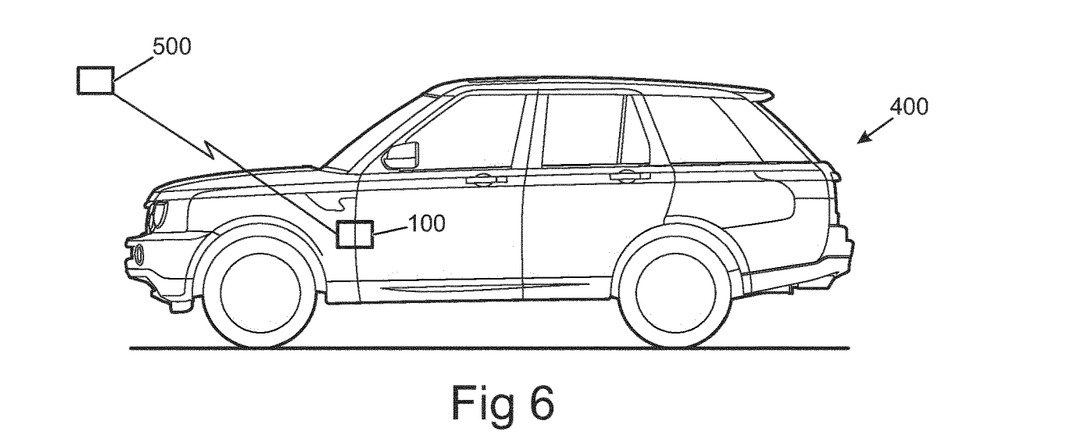
FIG. 6 illustrates an example of a vehicle comprising the vehicle system.

FIG. 6 illustrates an example of the vehicle 400 comprising a vehicle system 100 as previously described.

In this example the vehicle system 100 may be configured to communicate with a remote server 500 that is outside of the vehicle 400.

In this vehicle system 100, the system 100 is configured to automatically control a target state of charge 14 of the traction battery 110 and a timing 12 of charging the traction battery 110 in dependence upon both the next vehicle journey 10 and one or more characteristics of at least one charging point 20 of the next vehicle journey 10. Referring back to FIG. 1B, the vehicle system at point A may control the target state of charge 14 of charging the traction battery 110 and a timing 12 of charging the traction battery 110, in dependence upon at least the characteristics of the charging point at point A and/or the characteristics of the charging point at point B and/or the characteristics of the charging point at point C. It will be understood that the timing 12 of charging the traction battery may be a specified start time and an end time for charging of the traction battery 110 or a start time and a duration for charging of the traction battery 110 or any other suitable charging strategy.

For example the characteristics of the current charging point 20, point A, may be one or more of a charging tariff at the current charging point 20, a future tariff at the current charging point 20 (for example a night-time or off-peak tariff), a charging rate (speed) at the current charging point 20 and a wait time for the current charging point 20.

The characteristics for the next charging point 20, for example at point B and optionally point C, may be one or more of a tariff at the next charging point 20, a future tariff at the next charging point 20 (for example a night-time or off-peak tariff), a charging rate (speed) at the next charging point and a wait time at the next charging point.

The system 100 may comprise a transceiver for communicating wirelessly with the remote server 500 to download at least some of these characteristics. Alternatively, it may be possible for the vehicle system 100 to download some of these characteristics via the charging interface 120 during charging.

In this example the charging controller 130 of the vehicle system 100, is configured to automatically control both the target state of charge 14 of charging the traction battery 110 and a timing 12 of charging up the traction battery 110 in dependence upon the next vehicle journey 10 by optimising a cost determined by a cost function. The cost function can determine a cost for each of the charging points 20 in the journey. The cost function at each charging point 20 may be optimised so that the total cost of the whole journey is minimal while satisfying the constraint of always charging the traction battery sufficiently to travel from each of the charging points 20 to the next charging point and possibly other constraints such as time available at a charging point.

The cost function may determine cost using a time of arrival criterion or criteria and/or a financial cost criterion or criteria. For example, the time of arrival cost would be sensitive to charging point characteristics such as the charging rate at a charging point 20, the wait time at the charging point 20, time available at the charging point, any delay necessary to achieve a reduced tariff in the future and any timing constraints regarding the journey such as when a particular waypoint must be reached or left. The financial cost criterion or criteria would be dependent upon the characteristics of the charging point 20 such as the tariff at the charging point 20 and the future tariff at the charging point 20. It will therefore be appreciated that both the target state of charge 14 of the traction battery 110 and the timing 12 of charging of the traction battery 110 at each charging point 20 may be automatically controlled to minimise the cost function.

Whether or not the cost function is based upon a time of arrival criteria and/or a financial cost criteria or the extent to which it is based on these different criteria may be dependent upon user input. For example the cost function may be pre-programmed at the start of a journey by user selection as part of setting up navigation for the journey. For example, the navigation module 150 may ask the user whether they wish to have a route that is optimised for financial cost and/or optimised for time of arrival.

Figure 7:
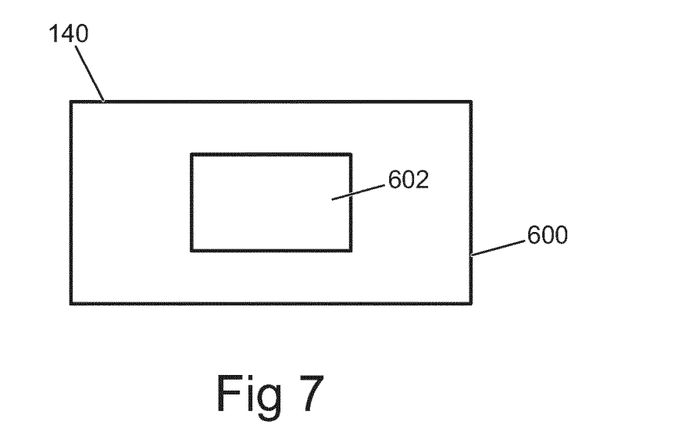
FIG. 7 illustrates an example of a man machine interface.

Referring to FIG. 7, the vehicle system 100 may comprise a human machine interface 140 that displays a notice 600 informing a vehicle occupant of the automatic control of the target state of charge 14 of the traction battery 110, in dependence upon the next vehicle journey 10 and the timing 12 of the charging of the traction battery 110. For example, the user may be kept informed and reassured about how the vehicle system 100 is managing charging of the traction battery 110.

In this example, the human machine interface 140 additionally displays a notice 602 informing the vehicle occupant that this automatic control of charging is temporary and that user-programmed vehicle settings that control a timing of charging of the traction battery and/or a charging level of charging the traction battery will be restored. This reassures the occupant the programmed user-programmed vehicle settings 160, although being temporarily overwritten, will be restored and that there will not be any requirement for them to reprogram the vehicle system 100.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The stages illustrated in FIG. 1 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for controlling charging of a traction battery of a vehicle, the controller comprising an electronic processor and a memory device with instructions stored therein, the electronic processor being configured to access the memory device and execute the instructions such that the controller is configured to:
  determine a state of charge of the traction battery;
  determine, dependent upon the state of charge of the traction battery and at least part of a next vehicle journey, one or more of: a target state of charge to be achieved, a rate of charging of the traction battery, a duration of charging of the traction battery, a start time of charging of the traction battery; and
  temporarily override any user-programmed vehicle settings controlling the target state of charge to be achieved and/or the rate of charging of the traction battery and/or the duration of charging of the traction battery and/or the start time of charging of the traction battery.

2. The controller as claimed in claim 1, wherein the controller overrides the user-programmed vehicle settings until the next vehicle journey is complete or until the vehicle including the traction battery is next switched on or next switched off.

3. The controller as claimed in claim 1, wherein the one or more of the target state of charge to be achieved, the rate of charging of the traction battery, the duration of charging of the traction battery, and the start time of charging of the traction battery is adaptively controlled by the controller.

4. The controller as claimed in claim 1, wherein the controller is configured to control the one or more of the target state of charge to be achieved, the rate of charging of the traction battery, the duration of charging of the traction battery, and the start time of charging of the traction battery in dependence upon a next charging point of the next vehicle journey.

5. The controller as claimed in claim 1, wherein the controller is configured to control the one or more of the target state of charge to be achieved, the rate of charging of the traction battery, the duration of charging of the traction battery, and the start time of charging of the traction battery so that a charging level of the traction battery is sufficient to reach a next charging point of the next vehicle journey.

6. The controller as claimed in claim 1, wherein the controller is configured to control the start time of charging of the traction battery to enable immediate charging of the traction battery.

7. The controller as claimed in claim 1, configured to automatically determine when a next vehicle journey requires charging of the traction battery.

8. The controller as claimed in claim 1, wherein the next vehicle journey is a part of a journey in progress or at least a part of a scheduled journey not yet started.

9. The controller as claimed in claim 8, wherein the next vehicle journey is at least one of: from a charging waypoint in the journey in progress or to a user-programmed destination, wherein the next vehicle journey exceeds a range of the traction battery.

10. The controller as claimed in claim 1, further configured to control one or more of the target state of charge to be achieved, the rate of charging of the traction battery, the duration of charging of the traction battery, and the start time of charging of the traction battery in dependence upon one or more characteristics of at least one charging point of the next vehicle journey.

11. The controller as claimed in claim 10, wherein the one or more characteristics are characteristics of at least one of:
  a current charging point, the characteristics selected from: tariff at the current charging point, a future tariff at the current charging point, a charging rate at the current charging point and a wait-time for the current charging point; or
  a next charging point, the characteristics selected from: a tariff at the next charging point, a future tariff at the next charging point, a charging rate at the next charging point and a wait-time at the next charging point.

12. A vehicle system comprising the controller as claimed in claim 10, and wherein the vehicle system is configured to communicate with a remote server to download at least some of the characteristics.

13. The controller as claimed in claim 1, including an output and configured to send a signal indicating automatic control of charging the traction battery.

14. A vehicle system including the controller as claimed in claim 13, the vehicle system comprising a human machine interface configured to display the automatic control of charging the traction battery and optionally, inform a vehicle occupant that the automatic control of charging the traction battery is temporary and that user-programmed vehicle settings will be restored.

15. The controller as claimed in claim 1, further configured to control one or more of the target state of charge to be achieved, the rate of charging of the traction battery, the duration of charging of the traction battery, and the start time of charging of the traction battery in dependence upon the next vehicle journey by optimising a cost determined by a cost function, wherein the cost function determines cost using a time of arrival criterion and/or a financial cost criterion.

16. A vehicle system comprising a controller as claimed in claim 1.

17. A vehicle comprising a controller as claimed in claim 1.

18. A method, for controlling charging of a traction battery of a vehicle, the method comprising:
  determining a state of charge of the traction battery;
  determining, dependent upon the state of charge of the traction battery and at least part of the next vehicle journey, one or more of: a target state of charge to be achieved, a rate of charging of the traction battery, a duration of charging of the traction battery, a start time of charging of the traction battery; and
  temporarily overriding any user-programmed vehicle settings controlling the target state of charge to be achieved and/or the rate of charging of the traction battery and/or the duration of charging of the traction battery and/or the start time of charging of the traction battery.

19. A non-transitory computer-readable storage medium comprising a computer program, that when loaded into a processor causes the processor to perform the following:
  determine a state of charge of the traction battery;
  determine, dependent upon the state of charge of the traction battery and at least part of the next vehicle journey, one or more of: a target state of charge to be achieved, a rate of charging of the traction battery, a duration of charging of the traction battery, a start time of charging of the traction battery; and
  temporarily override any user-programmed vehicle settings controlling the target state of charge to be achieved and/or the rate of charging of the traction battery and/or the duration of charging of the traction battery and/or the start time of charging of the traction battery.

20. The controller as claimed in claim 1, configured to temporarily override any user-programmed vehicle settings automatically in dependence on the at least part of the next vehicle journey.

21. The controller as claimed in claim 1, configured to determine whether the at least part of the next vehicle journey requires additional charging, and temporarily override any user-programmed vehicle settings if it is determined that the at least part of the next vehicle journey requires additional charging.

\* \* \* \* \*